US012242516B2

(12) United States Patent
Lee et al.

(10) Patent No.: US 12,242,516 B2
(45) Date of Patent: Mar. 4, 2025

(54) ELECTRONIC DEVICE AND METHOD FOR OPERATING CONTENT USING SAME

(71) Applicant: SAMSUNG ELECTRONICS CO., LTD., Suwon-si (KR)

(72) Inventors: Kunhee Lee, Suwon-si (KR); Sangheon Kim, Suwon-si (KR); Juhyung Lee, Suwon-si (KR); Sungjae Noh, Suwon-si (KR); Dongyul Lee, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/885,444

(22) Filed: Aug. 10, 2022

(65) Prior Publication Data

US 2022/0382788 A1     Dec. 1, 2022

Related U.S. Application Data

(63) Continuation of application No. PCT/KR2021/001400, filed on Feb. 3, 2021.

(30) Foreign Application Priority Data

Feb. 10, 2020  (KR) .......................... 10-2020-0015713

(51) Int. Cl.
*G06F 16/28*      (2019.01)
*G06F 3/041*      (2006.01)
(Continued)

(52) U.S. Cl.
CPC ............ *G06F 16/287* (2019.01); *G06F 3/041* (2013.01); *G06F 16/2393* (2019.01); *G06F 16/955* (2019.01)

(58) Field of Classification Search
CPC ... G06F 16/287; G06F 16/955; G06F 16/2393
See application file for complete search history.

(56) References Cited

U.S. PATENT DOCUMENTS

2008/0065693 A1* 3/2008 Malik ..................... H04H 60/37
2011/0289530 A1* 11/2011 Dureau ................... G06F 16/78
                                                              725/38

(Continued)

FOREIGN PATENT DOCUMENTS

JP       2010-257169      11/2010
KR   10-2012-0113057      10/2012
(Continued)

*Primary Examiner* — Kannan Shanmugasundaram
(74) *Attorney, Agent, or Firm* — NIXON & VANDERHYE P.C.

(57) ABSTRACT

Various embodiments of the disclosure relate to an electronic device, and a method for operating content using the electronic device, wherein the electronic device comprises: a wireless communication circuit; a touch display; a memory; and a processor operatively connected to the wireless communication circuit, the touch display, and the memory. The processor is configured to: receive tag information on various types of content and update a database; obtain tag information having a specific keyword; control the touch display to display a search result for the various types of content corresponding to the obtained tag information; receive selection of at least one content from among the various types of content; receive action information for the selected at least one content; and perform an action corresponding to the received action information. Thus, it is possible to transmit, to another electronic device, various types of content grouped based on the same tag information by attaching the various types of content to one message.

12 Claims, 13 Drawing Sheets

(51) Int. Cl.
*G06F 16/23* (2019.01)
*G06F 16/955* (2019.01)

(56) References Cited

U.S. PATENT DOCUMENTS

| | | |
|---|---|---|
| 2013/0080900 A1 | 3/2013 | Wilde et al. |
| 2014/0082682 A1 | 3/2014 | Choi et al. |
| 2014/0181879 A1 | 6/2014 | Ki et al. |
| 2015/0039693 A1* | 2/2015 | Itamoto ................ G06F 16/958 709/204 |
| 2015/0186366 A1* | 7/2015 | Yan .................... G06F 16/2246 707/741 |
| 2016/0162591 A1 | 6/2016 | Dokania et al. |
| 2016/0269334 A1* | 9/2016 | DeSouza Sana ....... H04L 51/18 |

FOREIGN PATENT DOCUMENTS

| | | |
|---|---|---|
| KR | 10-2012-0114505 | 10/2012 |
| KR | 10-2013-0031942 | 4/2013 |
| KR | 10-2013-0063914 | 6/2013 |
| KR | 10-2014-0142488 | 12/2014 |
| KR | 10-2015-0022588 | 3/2015 |
| KR | 10-2015-0025301 | 3/2015 |

* cited by examiner

ELECTRONIC DEVICE AND METHOD FOR OPERATING CONTENT USING SAME

CROSS-REFERENCE TO RELATED APPLICATIONS

This application is a continuation of International Application No. PCT/KR2021/001400, designating the United States, filed on Feb. 3, 2021, in the Korean Intellectual Property Receiving Office and claiming priority to Korean Patent Application No. 10-2020-0015713, filed on Feb. 10, 2020, in the Korean Intellectual Property Office, the disclosures of which are incorporated by reference herein in their entireties.

BACKGROUND

Field

The disclosure relates to an electronic device and a method for operating various types of contents using the electronic device.

Description of Related Art

The use of portable electronic devices such as smart phones and tablet PCs is increasing.

The electronic device may include various types of applications installed therein and perform various functions using the applications.

The applications installed in the electronic device may be selectively executed according to a user's preference.

The electronic device may include a display for displaying contents such as text, images, and videos.

As the technology of the portable electronic device develops, the types of applications executable in the electronic device are diversified.

The electronic device may execute an application and provide various functions to the user.

A user of the electronic device may have difficulty in managing and operating various types of contents (e.g., text, images, and files) used in various types of applications.

SUMMARY

Embodiments of the disclosure may provide an electronic device and a method for managing and operating various types of contents having the same tag information.

An electronic device according to various example embodiments of the disclosure may include: a wireless communication circuit; a touch display; a memory; and a processor operatively connected to the wireless communication circuit, the touch display, and the memory, wherein the processor is configured to: receive tag information on various types of contents and update a database; acquire tag information having a specific keyword; and control the touch display to display search results for the various types of contents corresponding to the acquired tag information; receive selection of at least one content from among the various types of contents; receive action information for the selected least one content; and perform an action corresponding to the received action information.

A method according to various example embodiments of the disclosure relates to method for operating a content using an electronic device, and the method, which is performed by a processor, may include: receiving tag information on various types of contents and updating a database; acquiring tag information having a specific keyword; displaying, on a touch display, search results for the various types of contents corresponding to the acquired tag information; receiving selection of at least one content from among the various types of contents; receiving action information for the selected least one content; and performing an action corresponding to the received action information.

According to various example embodiments of the disclosure, various types of contents (e.g., text, images, and files) having the same tag information may be selected and grouped for an action (e.g., sharing and transmission). For example, according to various embodiments of the disclosure, different types of contents having been grouped based on the same tag information may be selected, the selected grouped different types of contents may be attached to one message, and the attached contents and message may then be transmitted to another electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
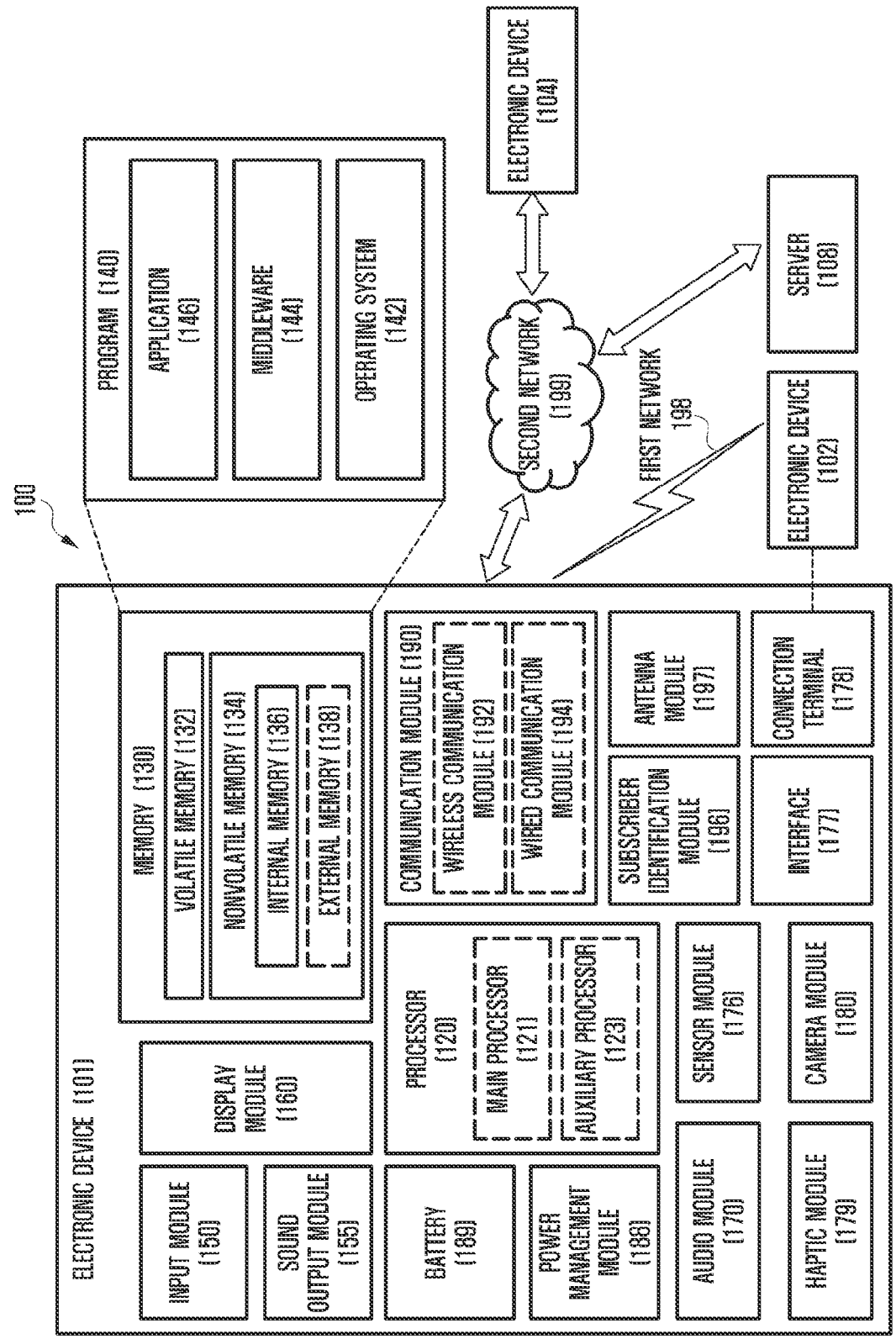
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display)

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102)(e.g., a speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
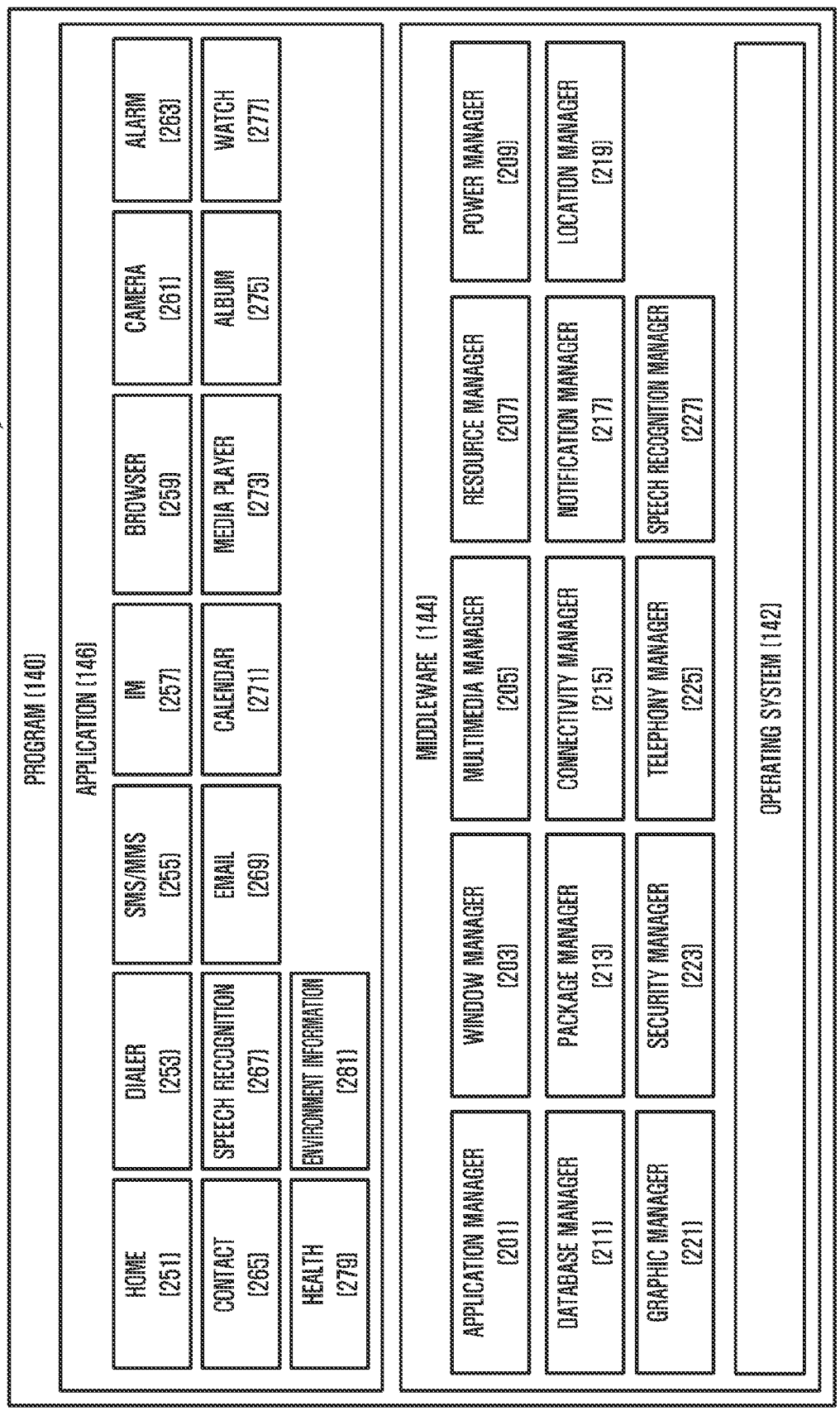
FIG. 2 is a block diagram illustrating an example configuration of a program according to various embodiments.

FIG. 2 is a block diagram 200 illustrating an example configuration of a program 140 according to various embodiments.

According to an embodiment, the program 140 may include an operating system 142 for controlling one or more resources of an electronic device 101, middleware 144, or an application 146 executable therein. The operating system 142 may include, for example, Android™, iOS™, Windows™, Symbian™ Tizen™, or Bada™. At least a part of the program 140 may be, for example, preloaded into the electronic device 101 at the time of manufacture, or be downloaded or updated from an external electronic device (e.g., the electronic device 102 or 104, or the server 108) when used by a user.

The operating system 142 may control management (e.g., allocation or retrieval) of one or more system resources (e.g., a process, a memory, or power) of the electronic device 101. The operating system 142 may additionally or alternatively include one or more driver programs for driving other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that functions or information provided from one or more resources of the electronic device 101 is usable by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphics manager 221, a security manager 223, a call manager 225, or a speech recognition manager 227.

The application manager 201 may manage, for example, the life cycle of the application 146. The window manager 203 may manage, for example, one or more GUI resources used in a screen. The multimedia manager 205 may, for example, identify one or more formats required for playback of media files, and using a codec suitable for a corresponding format selected from among the identified formats, encode or decode a corresponding media file among the media files. The resource manager 207 may manage, for example, the source code of the application 146 or the memory space of the memory 130. The power manager 209 may manage, for example, the capacity, temperature, or power of the battery 189, and may determine or provide related information required for the operation of the electronic device 101 using corresponding information thereof. According to an embodiment, the power manager 209 may interwork with a basic input/output system (BIOS) (not shown) of the electronic device 101.

The database manager 211 may, for example, generate, search for, or change a database to be used by the application 146. The package manager 213 may manage, for example, installation or update of an application distributed in the form of a package file. The connectivity manager 215 may manage, for example, a wireless connection or a direct connection between the electronic device 101 and an external electronic device. The notification manager 217 may provide, for example, a function for notifying a user of the occurrence of a designated event (e.g., an incoming call, a message, or an alarm). The location manager 219 may manage, for example, location information of the electronic device 101. The graphic manager 221 may manage, for example, one or more graphic effects to be provided to a user or a user interface related thereto.

The security manager 223 may provide, for example, system security or user authentication. The telephony manager 225 may manage, for example, a voice call function or a video call function provided by the electronic device 101. The speech recognition manager 227 may, for example, transmit a user's speech data to the server 108, and receive, from the server 108, a command corresponding to a function to be performed in the electronic device 101 based on at least in part of the speech data, or text data converted based on at least in part of the speech data. According to an embodiment, the middleware 144 may dynamically delete some of existing elements or add new elements. According to an embodiment, at least a part of the middleware 144 may be included as a part of the operating system 142 or implemented as software separate from the operating system 142.

The application 146 may include an application, for example, a home 251, a dialer 253, a SMS/MMS 255, an instant message (IM) 257, a browser 259, a camera 261, an alarm 263, a contact 265, a speech recognition 267, an email 269, a calendar 271, a media player 273, an album 275, a watch 277, health 279 (e.g., measuring biometric information such as exercise volume or blood sugar), or environment information 281 (e.g., measuring atmospheric pressure, humidity, or temperature information). According to an embodiment, the application 146 may further include an information exchange application (not shown) capable of supporting information exchange between the electronic device 101 and an external electronic device. The information exchange application may include, for example, a notification relay application configured to transmit designated information (e.g., call, message, or alarm) to an external electronic device, or a device management application configured to manage the external electronic device. The notification relay application may, for example, transmit notification information corresponding to a designated event (e.g., mail reception) generated in another application (e.g., the email application 269) of the electronic device 101 to an external electronic device. Additionally or alternatively, the notification relay application may receive notification information from the external electronic device and provide the received notification information to a user of the electronic device 101.

The device management application may control, for example, the power (e.g., turn-on or turn off) of an external electronic device communicating with the electronic device 101 or some elements thereof (e.g., the display device 160 or the camera module 180), or a function (e.g., brightness, resolution, or focus of the display device 160 or the camera module 180). The device management application may additionally or alternatively support installation, deletion, or update of an application operating in an external electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
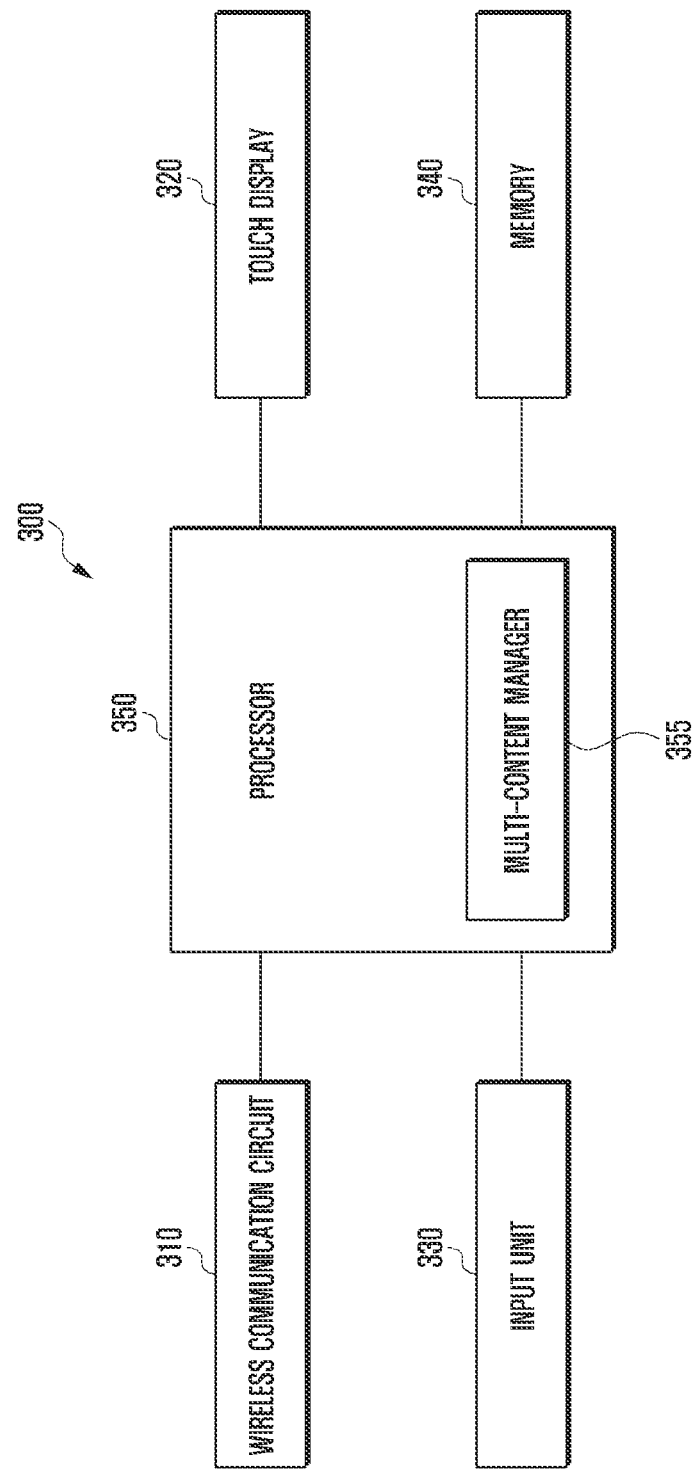
FIG. 3 is a block diagram illustrating an example configuration of an electronic device according to various embodiments.

FIG. 3 is a block diagram illustrating an example configuration of an electronic device according to various embodiments.

Referring to FIG. 3, an electronic device 300 according to various embodiments of the disclosure may include a wireless communication circuit 310, a touch display 320, an input unit (e.g., including input circuitry) 330, a memory 340, and a processor (e.g., including processing circuitry) 350.

According to various embodiments, the electronic device 300 of FIG. 3 may include the electronic device 101 disclosed in FIG. 1.

According to an embodiment, the wireless communication circuit 310 (e.g., the communication module 190 of FIG. 1) may transmit, to another electronic device, contents selected by a user of the electronic device 300 from among various contents having the same tag information and being grouped.

According to various embodiments, the wireless communication circuit 310 may transmit various pieces of information to external electronic devices 102, 104, and 108 using the first network 198 or the second network 199 disclosed in FIG. 1.

According to various embodiments, the wireless communication circuit 310 may establish a communication channel to support at least one of a voice call, a video call, and a data communication function of the electronic device 300. The wireless communication circuit 310 may include various communication modules such as a mobile communication module (at least one module capable of supporting various communication methods such as 2G, 3G, 4G, and 5G), a wireless fidelity (Wi-Fi) module, and a short-distance communication module. The wireless communication circuit 310 may include an ultra-wide band (UWB) communication circuit.

According to an embodiment, the touch display 320 (e.g., the display device 160 of FIG. 1) may receive tag information input from a user. The touch display 320 may display various types of contents (e.g., text, images, and files).

According to various embodiments, the touch display 320 may perform an input function and a display function. The touch display 320 may include a touch panel and a display. The touch display 320 may visually provide a menu, input data, function configuration information, or various other information of the electronic device 300 to a user.

According to an embodiment, the input unit 330 (e.g., the input device 150 of FIG. 1) may include various input circuitry and input a specific keyword related to tag information. The input unit 330 may be included in the touch display 320. The input unit 330 may support some functions of the touch display 320.

According to various embodiments, the input unit 330 may receive an input of textual or numeric information. The input unit 330 may include multiple input keys and function keys for configuring functions of the electronic device 300. The input unit 330 may include at least one of a keyboard, a mouse, and an electronic pen (e.g., a stylus pen) for inputting tag information.

According to an embodiment, the memory 340 (e.g., the memory 130 of FIG. 1) may store tag information (e.g., a keyword) received through the touch display 320 (or the input unit 330) and various types of contents (e.g., text, images, files) having the same tag information.

According to various embodiments, the memory 340 may perform a function of storing a program (e.g., the program 140 of FIG. 1 and FIG. 2) for processing and controlling the processor 350 of the electronic device 300, an operating system (OS) (e.g., the operating system 142 of FIG. 1 and FIG. 2), various applications, and input/output data, and a program for controlling the overall operation of the electronic device 300 may be stored therein. The memory 340 may store various configuration information required when functions related to various embodiments of the disclosure are processed in the electronic device 300. The memory 340 may include at least one database DB.

According to an embodiment, the processor 350 (e.g., the processor 120 of FIG. 1) may be operatively connected to the wireless communication circuit 310, the touch display 320, the input unit 330, and the memory 340. The processor 350 may include various processing circuitry and control functions and operations of the wireless communication circuit 310, the touch display 320, the input unit 330, and the memory 340.

According to an embodiment, the processor 350 may be configured to receive tag information (e.g., keyword) for each of various types of contents (e.g., text, images, and files) using the touch display 320, and may update the database of the memory 340.

According to an embodiment, the processor 350 may be configured to acquire tag information having a specific keyword input using the touch display 320, and provide search results for various types of contents corresponding to the acquired tag information.

According to an embodiment, the processor 350 may be configured to receive selection information for various types of contents using the touch display 320.

According to an embodiment, the processor 350 may be configured to receive action information (e.g., sharing, deletion, compression, and transmission) for the selected contents.

According to an embodiment, the processor 350 may be configured to perform an action (e.g., share, transmit) corresponding to the received action information.

According to various embodiments, the processor 350 may include a multi-content manager 355. The multi-content manager 355 may include various processing circuitry and/or executable program instructions and support collecting of information on various types of contents and updating of the database (DB), and performing of an action on the selected contents. The function of the multi-content manager 355 may be integrated into the processor 350. The multi-content manager 355 may be implemented integrally with the processor 350.

According to various embodiments, the processor 350 may control the overall operation of the electronic device 300 and the signal flow between internal elements, and perform a function of processing data. The processor 350 may include, for example, a central processing unit (CPU), an application processor, and a communication processor. The processor 350 may be configured by a single core processor or a multi-core processor. The processor 350 may be configured by multiple processors.

Figure 4:
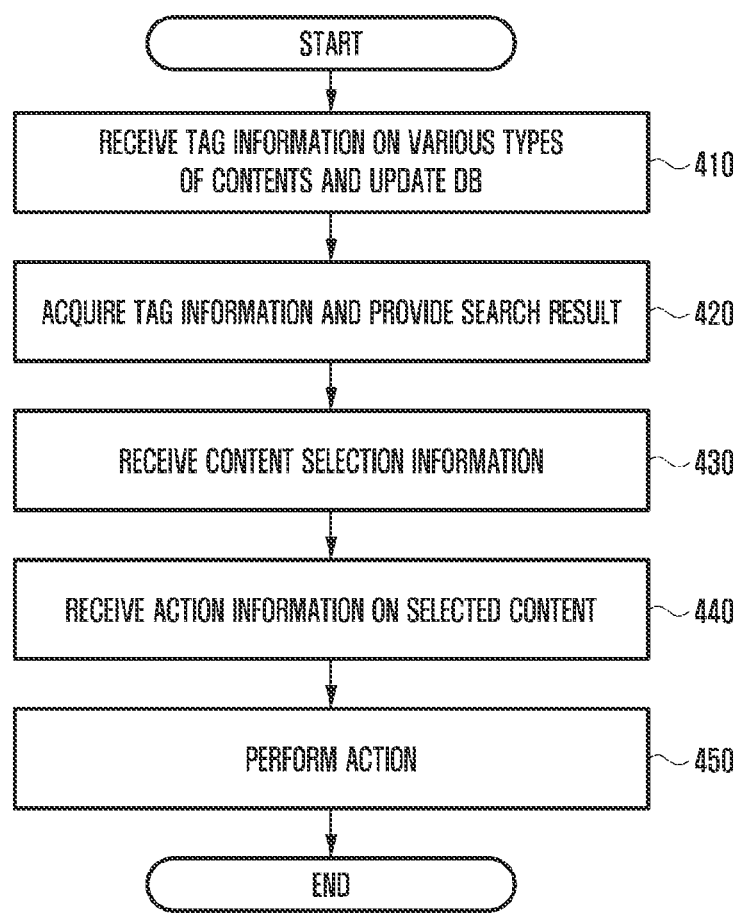
FIG. 4 is a flowchart illustrating an example method for operating a content using an electronic device according to various embodiments.

FIG. 4 is a flowchart illustrating an example method for operating a content using an electronic device according to various embodiments.

According to various embodiments, operations disclosed in the content management method of FIG. 4 may be performed using the electronic devices 101 and 300 illustrated in FIGS. 1 and 3.

In operation 410, the processor 350 may be configured to receive tag information (e.g., a keyword) for each of various types of contents (e.g., text, images, and files) using the touch display 320 (or the input unit 330), and may update a database (DB).

In operation 420, the processor 350 may be configured to acquire tag information having a specific keyword input using the touch display 320, and may display search results for various types of contents corresponding to the acquired tag information on the touch display 320.

According to an embodiment, the search results for the various types of contents may be displayed in the same or similar manner as a thumbnail.

In operation 430, the processor 350 may be configured to receive selection information regarding at least one content among various types of contents using the touch display 320.

In operation 440, the processor 350 may be configured to receive action information (e.g., sharing, deletion, compression, and transmission) of the selected content.

In operation 450, the processor 350 may be configured to perform an action corresponding to the action information received in operation 440.

According to an embodiment, when multiple contents of the various types are selected, the processor 350 may be configured to share or delete the selected multiple contents, or transmit the selected multiple contents to other electronic devices (e.g., the electronic devices 102 and 104 of FIG. 1) through a single action.

According to various embodiments, the operations illustrated in FIG. 4 may be described in greater detail below with reference to various drawings.

Figure 5:
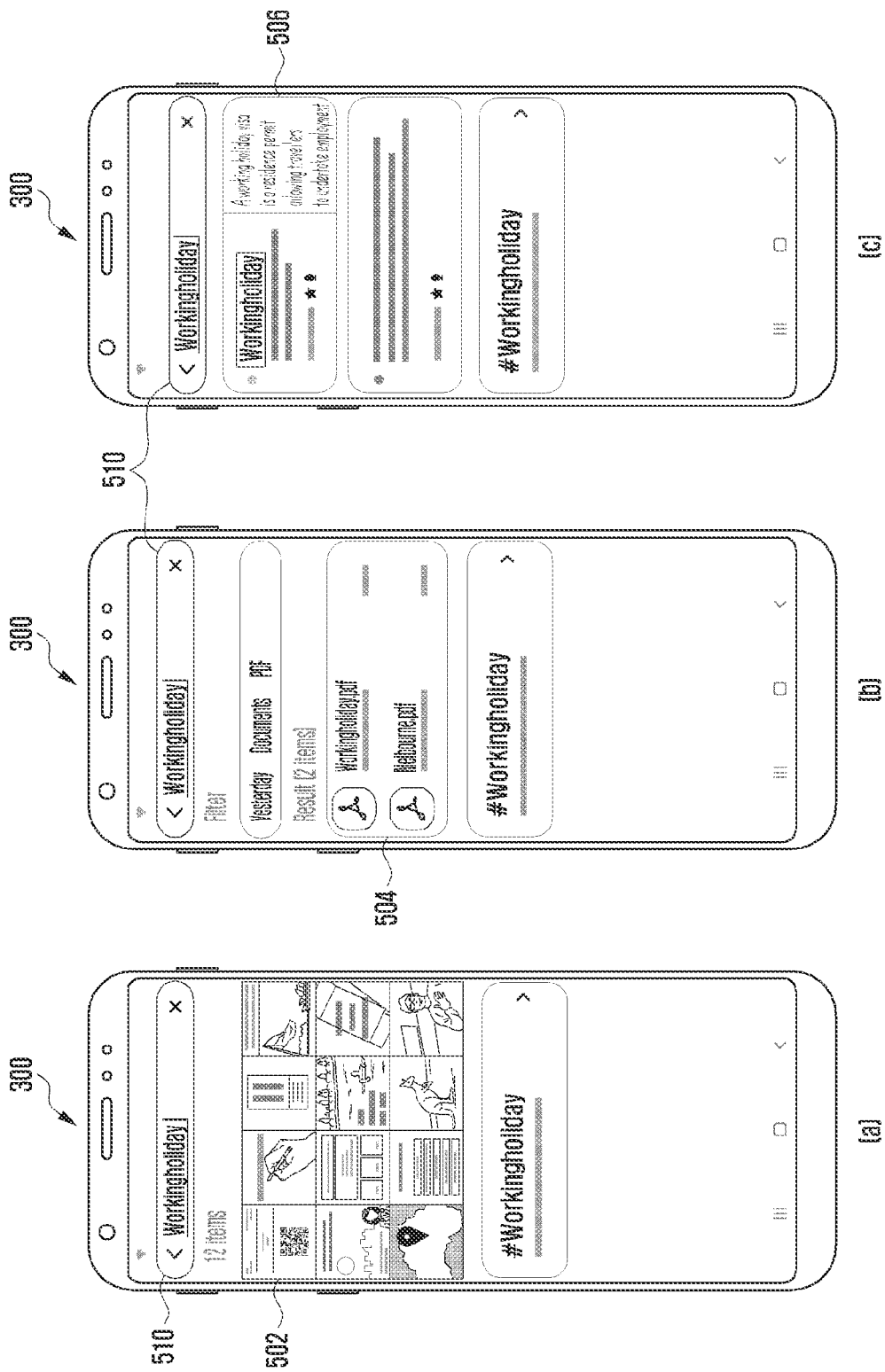
FIG. 5 is a diagram illustrating an example operation of receiving tag information for each content and updating database (DB) using an electronic device according to various embodiments.

FIG. 5 is a diagram illustrating an example operation of receiving tag information for each content and updating a database (DB) (e.g., operation 410 of FIG. 4) using an electronic device according to various embodiments.

According to an embodiment, when a tag is input to each content such as text, images, and files (e.g., MS word) for example, using the touch display 320, the processor 350 of the electronic device 300 may update the database (DB) in the memory 340.

According to various embodiments, the database (DB) may be configured by columns as shown in [Table 1] below.

TABLE 1

| tag_id | tag | tag_created_time | content_created_time | mime_type | dataUri |
| --- | --- | --- | --- | --- | --- |

According to an embodiment, tag_id may include a sequence in the database (DB) with regard to a tag, which is input using the touch display 320. The tag may include keyword information (e.g., working holiday) input using the touch display 320. Tag_created_time may include a time at which a tag, which is input using the touch display 320, is generated. Content_created_time may include a time at which a tag input using the touch display 320 is generated in a content. Mime_type may include the type of generated content (e.g., image, pdf, or video). DataUri may include a uniform resource identifier (URI) of specific content for which tag information is generated.

According to various embodiments, when a tag such as #working holiday, for example, is input to a content such as an image, using the touch display 320, the processor 350 may be configured to update the database (DB) with a column as shown in [Table 2] below.

TABLE 2

| tag_id | tag | tag_created_time | content_created_time | mime_type | dataUri |
|---|---|---|---|---|---|
| 15 | working holiday | 1577421000366 | 1577147985000 | Image/jpeg | content://media/external/images/media/43 |

Referring to FIG. 5, the electronic device 300 according to various embodiments of the disclosure may input and generate tag information, such as a working holiday, to various types of contents, and may search for various types of contents having the generated tag information (e.g., working holiday).

Referring to (a) of FIG. 5, when tag information such as a working holiday is input to a tag input window 510 using the touch display 320, the processor 350 may display images 502 having tag information corresponding to the working holiday in a thumbnail format.

Referring to (b) of FIG. 5, when tag information such as a working holiday is input to the tag input window 510 using the touch display 320, the processor 350 may display a pdf file 504 having tag information corresponding to the working holiday.

Referring to (c) of FIG. 5, when tag information such as a working holiday is input to the tag input window 510 using the touch display 320, the processor 350 may display information of text 506 having tag information corresponding to the working holiday.

Figure 6:
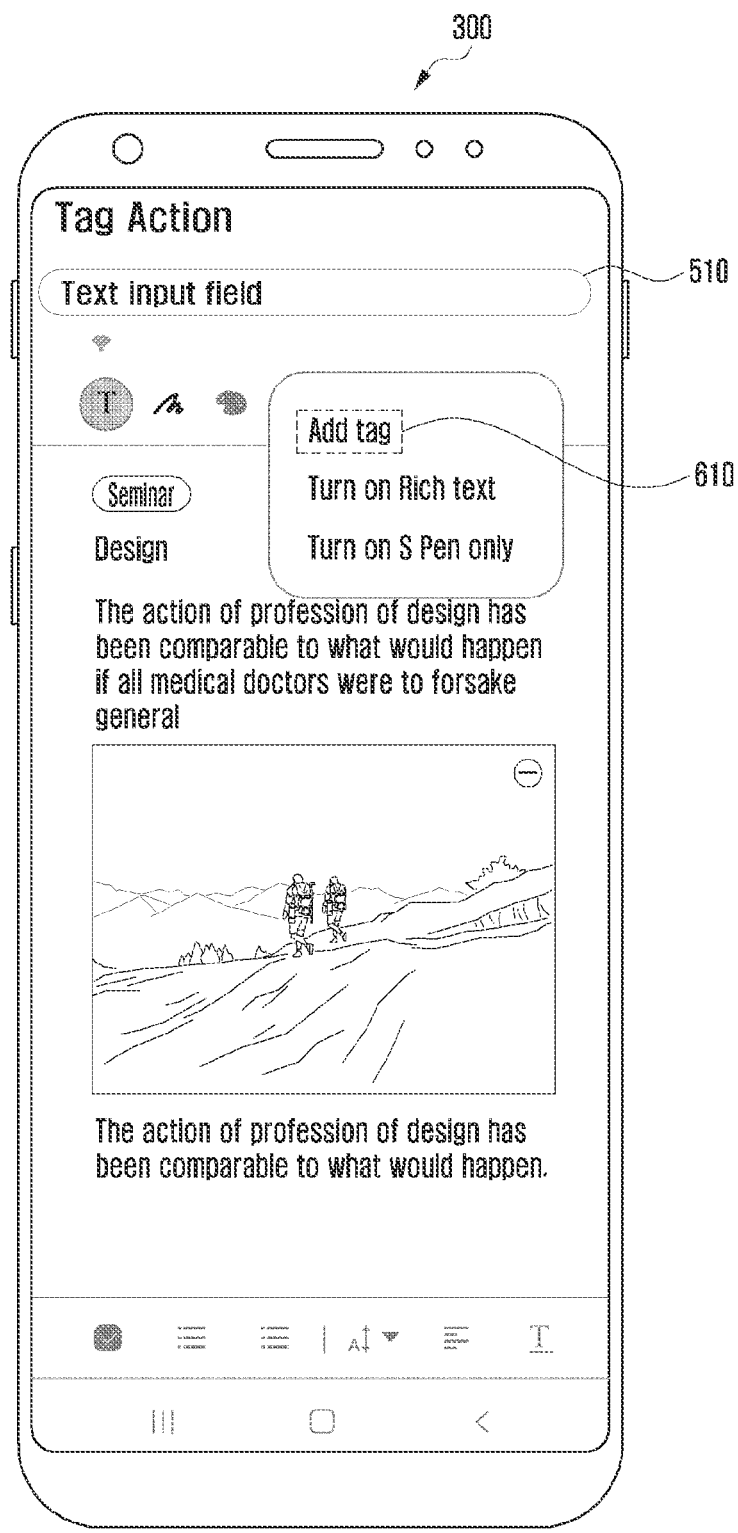
FIG. 6 is a diagram illustrating an example of recommending tag information using an electronic device according to various embodiments.

FIG. 6 is a diagram illustrating an example of recommending tag information using an electronic device according to various embodiments.

According to various embodiments, the electronic device 300 according to various embodiments of the disclosure may recommend tag information by analyzing tag information respectively generated in various types of contents (e.g., text, images, and files).

Referring to FIG. 6, when there is tag information (e.g., working holiday) having been previously selected and stored in the memory 340, the processor 350 of the electronic device 300 according to various embodiments of the disclosure may display the tag information on the tag input window 510. The tag information displayed on the tag input window 510 may be edited by a user of the electronic device 300.

According to various embodiments, when there is no previously selected tag information, the processor 350 may be configured to provide recommendable tag information through an Add tag item 610.

According to various embodiments, when the previously selected tag information or content is deleted from the memory 340, the processor 350 may not display the previously selected tag information or content on the touch display 320.

Figure 7:
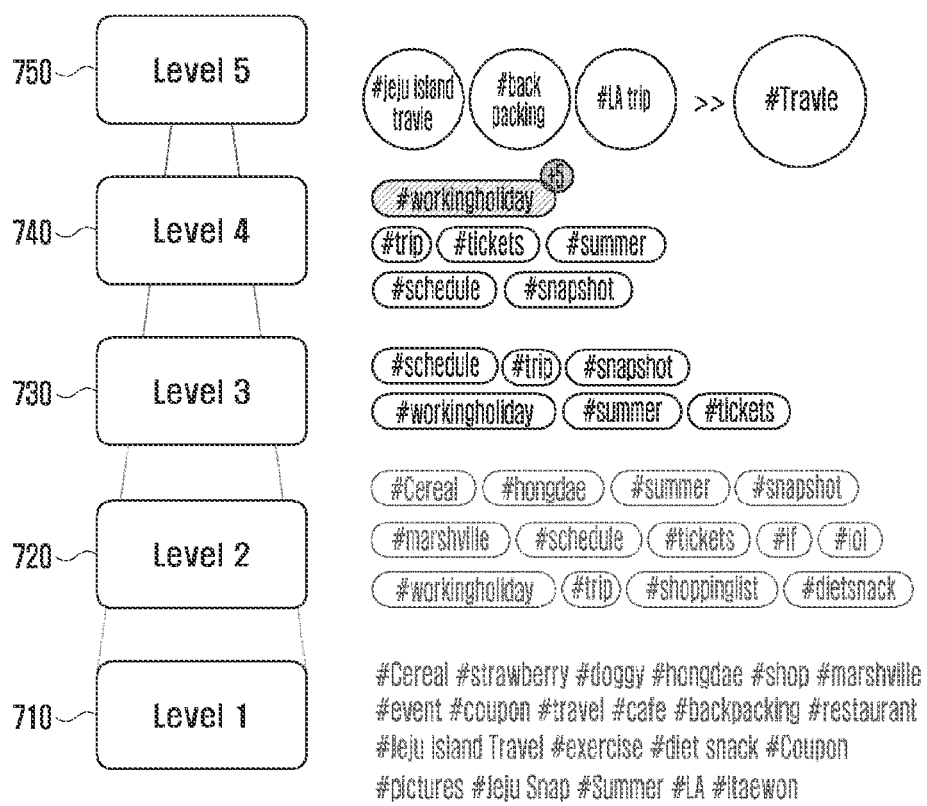
FIG. 7 is a diagram illustrating an example of providing tag information of high interest using an electronic device according to various embodiments.

FIG. 7 is a diagram illustrating an example of providing tag information of high interest using an electronic device according to various embodiments.

According to various embodiments, the electronic device 300 according to various embodiments of the disclosure may analyze tag information respectively generated in various types of contents (e.g., text, images, and files), and may extract and provide tag information which the user of the electronic device 300 is most interested in.

In operation 710 (e.g., Level 1), the processor 350 may be configured to extract previously used tag information (e.g., a keyword) from the memory 340.

In operation 720 (e.g., Level 2), the processor 350 may be configured to encapsulate a tag, which is usable as tag information of interest, in the previously input tag information (e.g., working holiday).

According to an embodiment, the usable tag may include tag information, having been used for different types of contents by a user a predetermined number of times or more using the touch display 320. The usable tag may include tag information, having been used by a user in two or more applications using the touch display 320. The usable tag may include tag information directly input by the user through the tag input window 510.

In operation 730 (e.g., Level 3), the processor 350 may be configured to group tag information that is duplicated and continuously used for contents having different types.

According to an embodiment, the processor 350 may display the grouped tag information on the touch display 320 in a zoomed-out form.

In operation 740 (e.g., Level 4), the processor 350 may be configured to select the most used tag information (e.g., working holiday) from among the tag information included in one group, and store and manage the selected tag information as a representative tag information group in the memory 340.

According to an embodiment, the representative tag information (e.g., working holiday) may be designated as a representative keyword.

In operation 750 (e.g., Level 5), the processor 350 may be configured to extract, as the level of highest interest (e.g., Travel), for example, a proper noun or tag information which is added by a user's direct input through the tag input window 510, from among the representative tag information groups.

According to various embodiments, the electronic device 300 according to various embodiments of the disclosure may automatically tag specific tag information (e.g., working holiday) to contents having different types. For example, the processor 350 may be configured to, using an automatic tagging solution (e.g., OCR), search for at least one of the contents of folders and contents stored in the memory 340, pages and history stored in bookmarks, file types (e.g., MS office), titles and memo contents entered in a schedule application, or memo contents of a reminder entered in a calendar application, and automatically generate tag information in the corresponding content.

Figure 8:
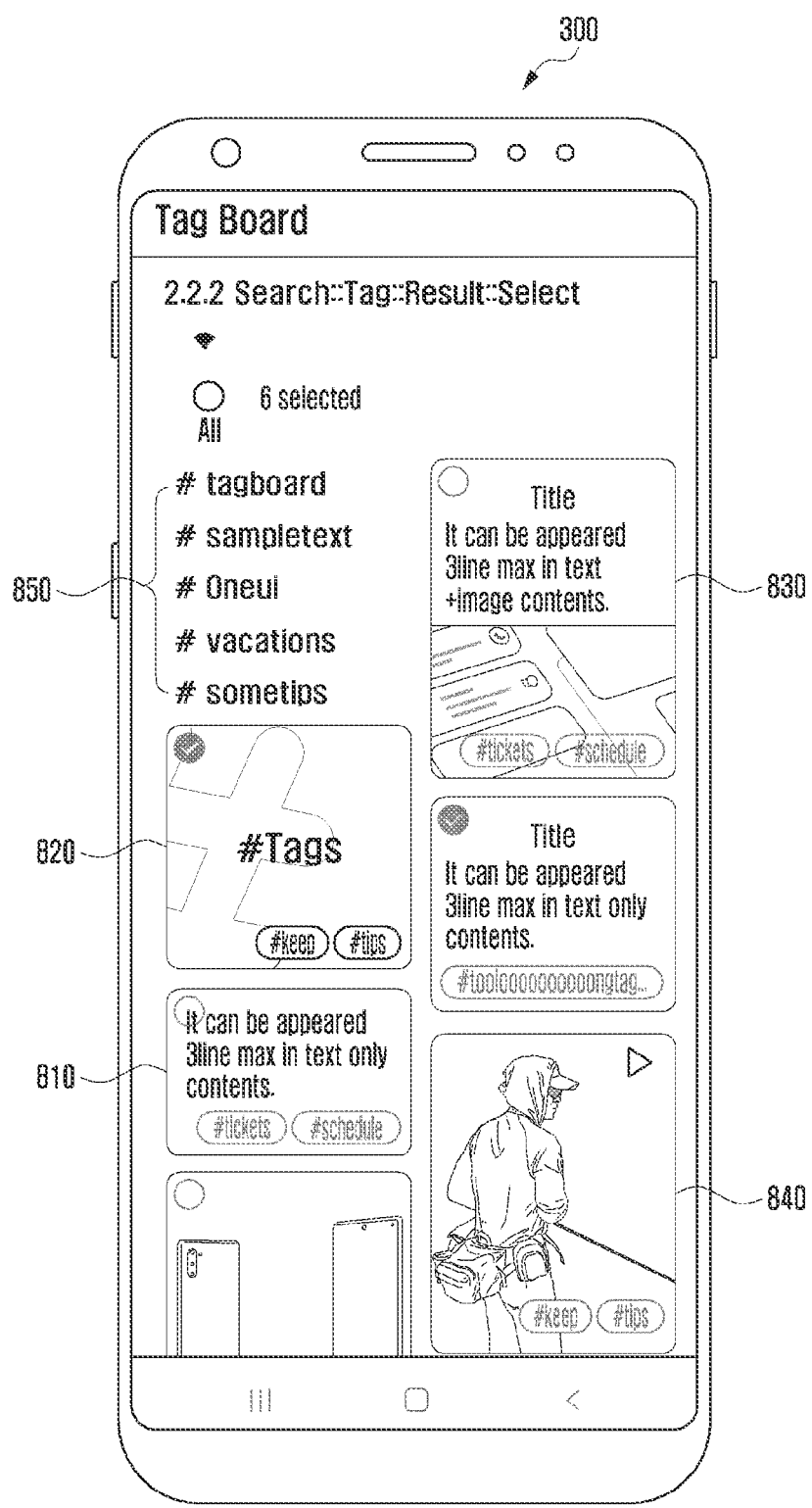
FIG. 8 is a diagram illustrating an example operation of acquiring tag information having a specific keyword and displaying search results for various types of contents corresponding to the tag information using an electronic device according to various embodiments.

FIG. 8 is a diagram illustrating an example operation of acquiring tag information having a specific keyword using an electronic device, and displaying search results for various types of contents corresponding to the tag information (e.g., operation 420 of FIG. 4) according to various embodiments.

According to various embodiments, the electronic device 300 may acquire tag information having a specific keyword input using the touch display 320, and display search results for various types of contents having the same tag information as the acquired tag information on the touch display 320 in the form of thumbnails.

Referring to FIG. 8, the processor 350 of the electronic device 300 may display search results for various types of contents having the same tag information on the touch display, using at least one of a text 810, an image 820, a screen 830 in which text and image are combined, or a video file 840.

According to various embodiments, the processor 350 may display search results for the various types of contents, on the touch display 320, by arranging in a temporal sequence of generation of results, such as the screen 830 in which text and an image are combined, the image 820, the text 810, and the video file 840, for example.

According to various embodiments, the processor 350 may display the text 810, the image 820, the screen 830 in which text and an image are combined, or the video file 840, which are search results, by distinguishing the same using a color or an icon, for example.

According to an embodiment, the processor 350 may be configured to analyze a specific keyword during providing the search results for various types of contents having the same tag information. The analysis of specific keywords may result in identification and removal of characters (e.g., special characters or symbols), which need to be excluded from tag information. For example, the processor 350 may be configured to identify and remove a symbol such as an under bar (_) of # working_holiday.

According to an embodiment, the processor 350 may be configured to search the memory 340 for a specific keyword (e.g., working holiday) input using the touch display 320 and call the specific keyword.

Referring to FIG. 8, the processor 350 of the electronic device 300 may display a tag information list 850 corresponding to keywords input using the touch display 320 in real time. In the tag information list 850, a keyword currently input by the user on the touch display 320 may be displayed in the first position. The tag information list 850 may be arranged in a sequence based on the number of frequencies used by the user.

Figure 9:
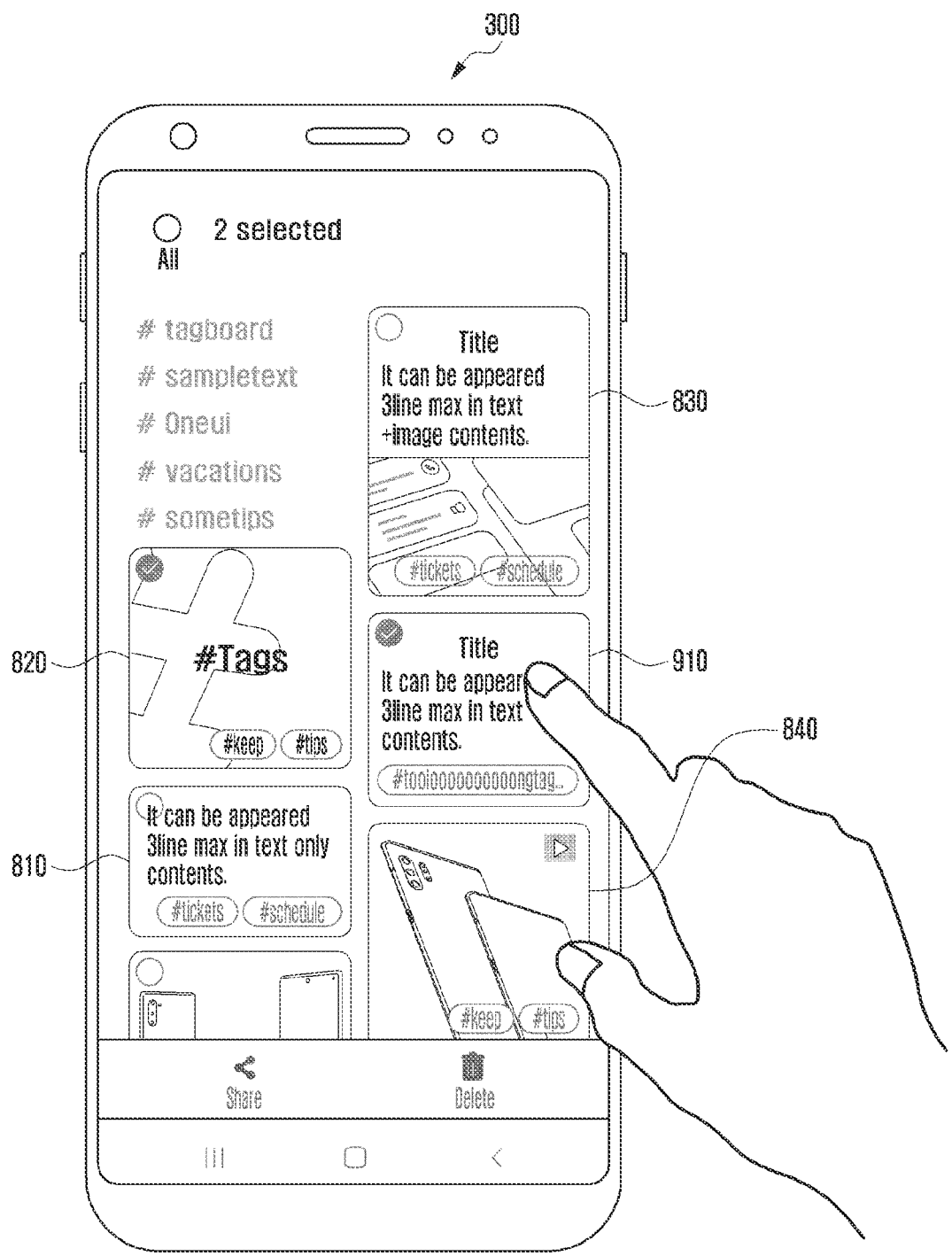
FIG. 9 is a diagram illustrating an example operation of receiving selection information for at least one content among various types of contents using an electronic device according to various embodiments.

FIG. 9 is a diagram illustrating an example operation (e.g., operation 430 of FIG. 4) of receiving selection information regarding at least one content among various types of contents using an electronic device according to various embodiments.

Referring to FIG. 9, the electronic device 300 according to various embodiments may be configured to select a text 910 having title information, for example, and an image, from among various types of contents, using the touch display 320.

According to various embodiments, the various types of contents (e.g., text, images, and files) may have attribute values assigned by each application. The attribute value of each of the various types of contents may be used while performing an action to be described in greater detail below.

Figure 10:
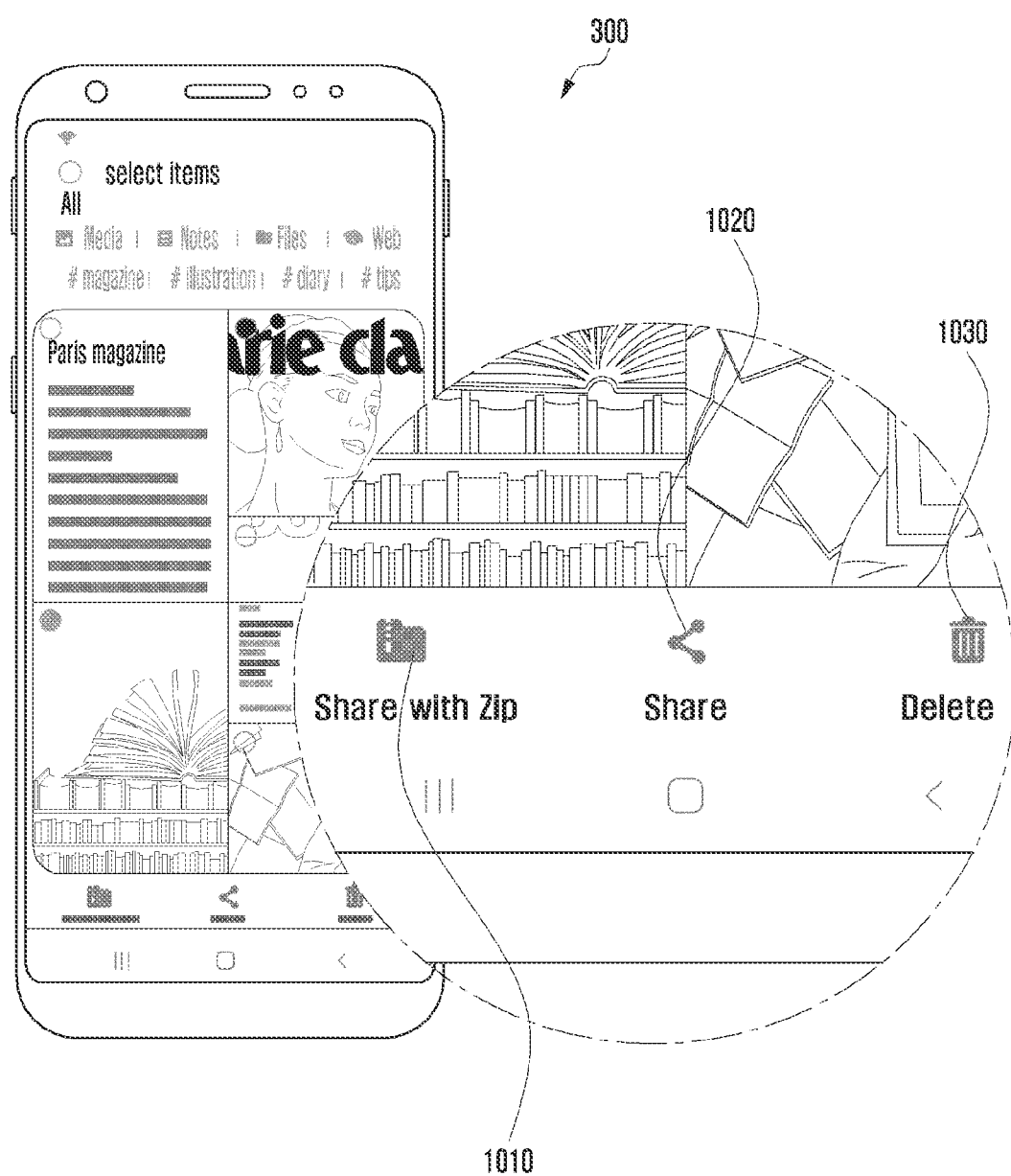
FIG. 10 is a diagram illustrating an example operation of receiving action information for selected contents using an electronic device according to various embodiments.

FIG. 10 is a diagram illustrating an example operation (e.g., operation 440 of FIG. 4) of receiving action information regarding contents selected using an electronic device according to various embodiments.

According to various embodiments, the electronic device 300 may receive at least one action information of compression and sharing, sharing, deletion, and transmission of various types of contents (e.g., text, images, and files). Each of the various types of contents may have different attribute values.

Referring to FIG. 10, the processor 350 of the electronic device 300 may display, on the touch display 320, action information, such as a compression and sharing item 1010, a sharing item 1020, a deletion item 1030, and a transmission item (not shown), so as to receive action information regarding various types of contents (e.g., the text 910 having title information and the image 820) selected through FIG. 9 described above.

According to various embodiments, when at least one of the action information is selected through the touch display 320, the processor 350 may generate a list of various types of contents based on the attribute value using the multi-content manager 355.

According to various embodiments, the processor 350 may be configured to process a URI corresponding to an attribute value of each of various types of contents in order to perform an action corresponding to the action information. According to an embodiment, the processor 350 may be configured to use dataUri corresponding to each of various types of contents stored in the memory 340 as it is in order to perform an action corresponding to the action information.

Figure 11:
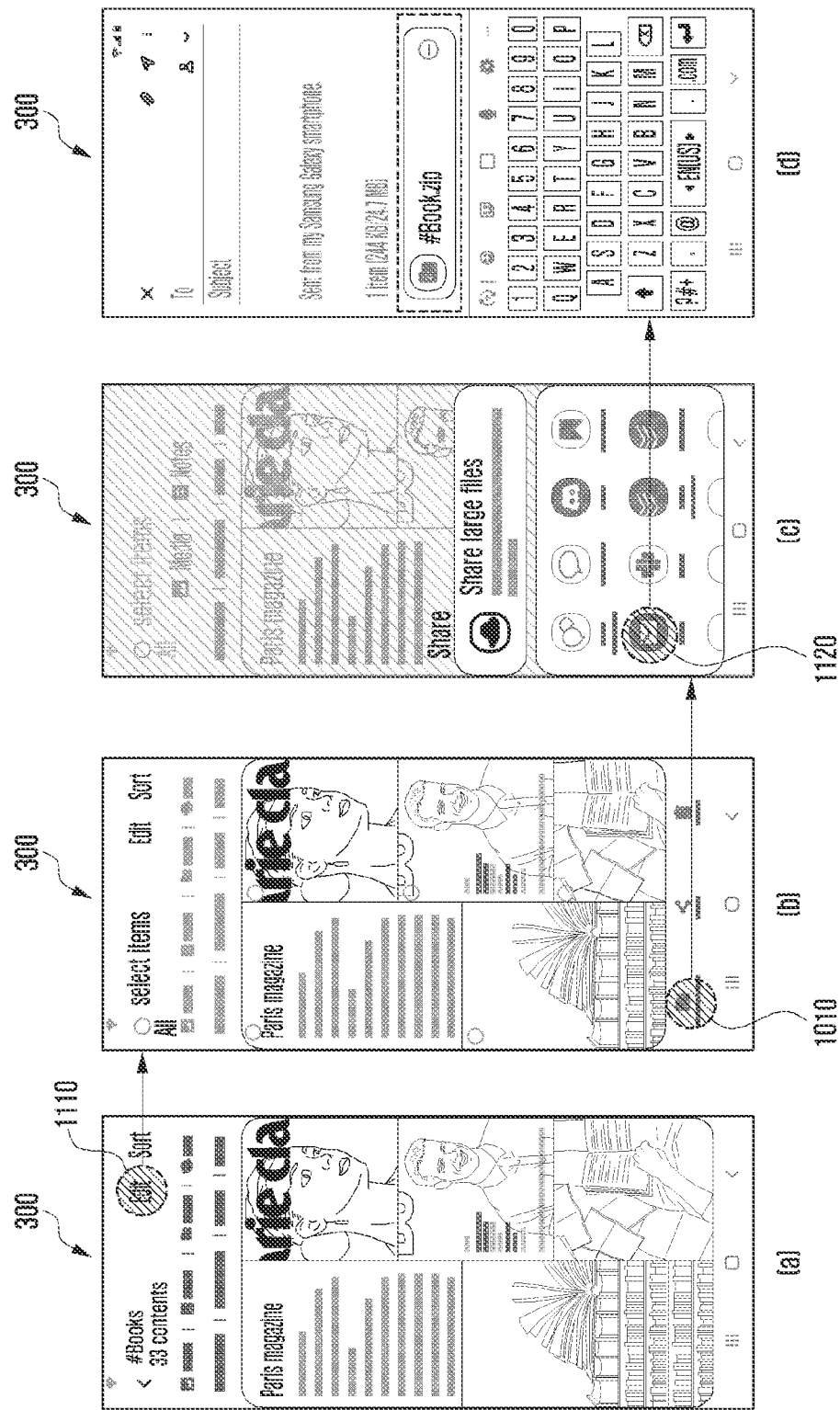
FIG. 11 is a diagram illustrating an example operation of performing an action corresponding to action information using an electronic device according to various embodiments.

FIG. 11 is a diagram illustrating an example operation (e.g., operation 450 of FIG. 4) of performing an action corresponding to action information using an electronic device according to various embodiments.

According to various embodiments, the electronic device 300 may perform an action corresponding to the action information, which is received through FIG. 10, based on the URI processed for an attribute value for each of various types of contents.

Referring to (a) of FIG. 11, the processor 350 of the electronic device 300 may display various types of contents having the same tag information on the touch display 320. The processor 350 may be configured to receive selection information regarding an editing item 1110 using the touch display 320 to perform an action corresponding to the action information.

Referring to (b) of FIG. 11, the processor 350 may be configured to receive selection information regarding the compression and sharing item 1010, which is a part of the action, using the touch display 320. The compression and sharing item 1010 may include a set of various types of contents being grouped and having the same tag information.

Referring to (c) of FIG. 11, the processor 350 may be configured to receive selection information regarding a message transmission item 1120 using the touch display 320.

Referring to (d) of FIG. 11, the processor 350 may be configured to transmit grouped various types of contents to other electronic devices (e.g., the electronic devices 102 and 104 of FIG. 1) according to the selection of the message transmission item 1120.

Figure 12:
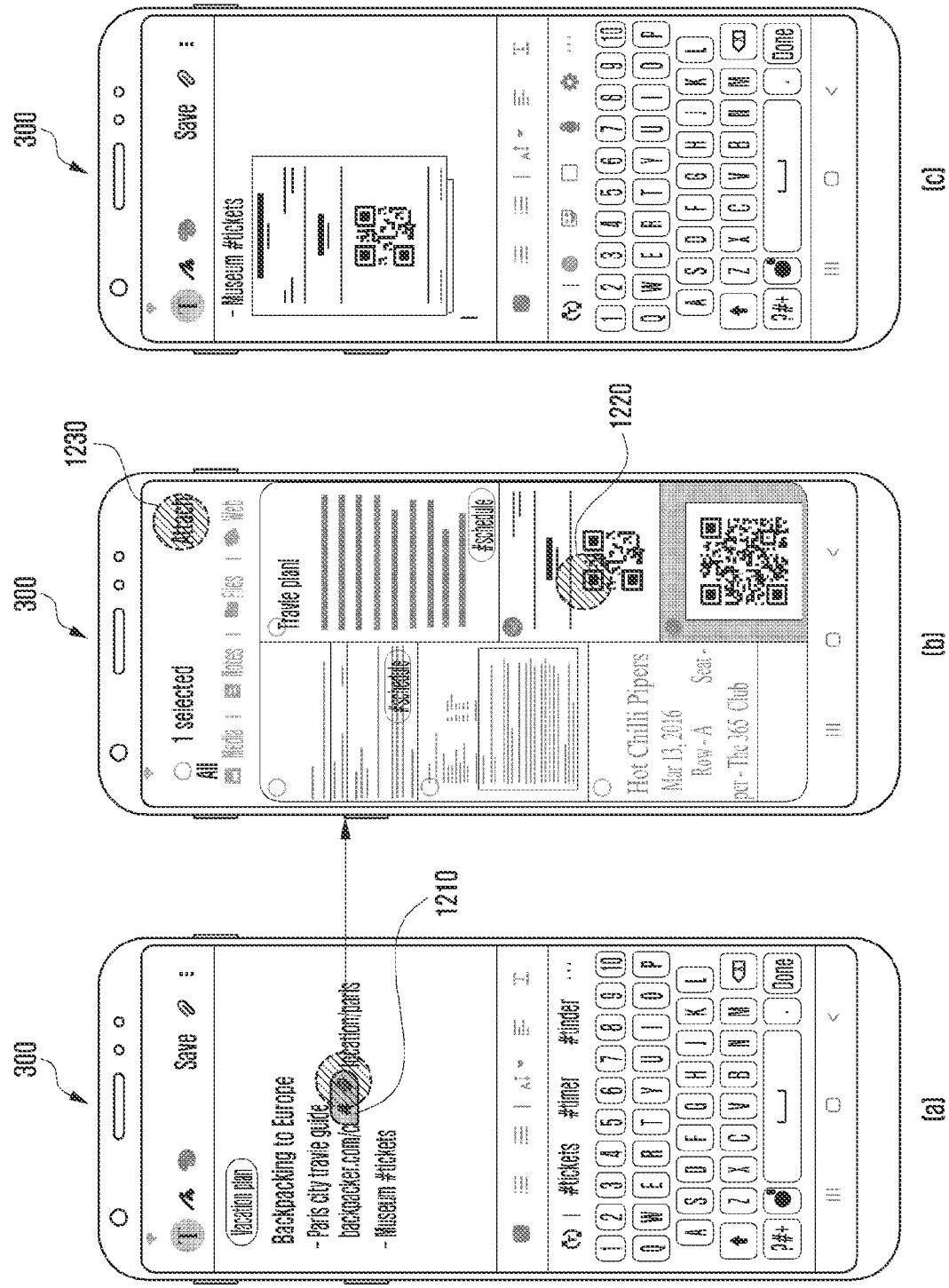
FIG. 12 is a diagram illustrating an example of connecting and inserting various types of contents using an electronic device according to various embodiments of the disclosure.

FIG. 12 is a diagram illustrating an example of connecting and inserting various types of contents using an electronic device according to various embodiments.

According to various embodiments, the electronic device 300 according to various embodiments of the disclosure may connect and insert various types of contents using different applications.

Referring to (a) of FIG. 12, the processor 350 may be configured to receive selection information regarding a pair item 1210 in one application using the touch display 320.

Referring to (b) of FIG. 12, the processor 350 may display, on the touch display 32, various types of contents (e.g., text, images, and files) having the same tag information according to reception of selection information regarding the pair item 1210.

According to various embodiments, the processor 350 may be configured to receive selection information regarding the QR code image 1220 and selection information regarding a file attachment item 1230 using the touch display 320.

Referring to (c) of FIG. 12, according to the reception of the selection information regarding the QR code image 1220 and the selection information regarding the file attachment item 1230, the processor 350 may insert the QR code image 1220 among various types of contents into another application using the touch display 320 and share the QR code image 1220 with another electronic device using the wireless communication circuit 310.

According to various embodiments, another electronic device having received the QR code image 1220 may scan the QR code image 1220 using a camera.

In the embodiment of FIG. 12, an example in which the processor 350 selects one content (e.g., the QR code image 1220) from among various types of contents and shares the selected content with another electronic device is described. However, the embodiment may not be limited thereto.

According to various embodiments, the processor 350 of the electronic device 300 may be configured to share various types of contents with another electronic device using link sharing. In the link sharing, various contents may be shared with another electronic device using a messenger such as SNS without signing up for a separate account.

According to various embodiments, the processor 350 may be configured to authenticate the electronic device 300 using a server (e.g., the server 108 of FIG. 1), and provide the contact of the electronic device 300 to other electronic devices (e.g., the electronic devices 102 and 104 of FIG. 1).

According to various embodiments, the processor 350 may be configured to automatically receive a recommendation of a contact, which has recently shared at least one content using direct sharing, or another electronic device desiring sharing at least one content. The processor 360 may automatically recommend, to a user of another electronic device, an application most used by a user of the electronic device 300 in a list of applications stored in the memory 340.

According to various embodiments, the processor 350 may be configured to select and group multiple contents from among various types of contents, and share the selected and grouped contents with other electronic devices using the wireless communication circuit 310. The other electronic devices may include at least one of a mobile terminal, a PC (e.g., desktop, laptop, or tablet), an automobile (e.g., connected car, digital key, infotainment), a home electronic device (e.g., TV, air conditioner, or vacuum cleaner), an IoT (AI speaker, sensor enabled devices, or smart things), a robot, or a drone.

According to various embodiments, the electronic device 300 may receive a location of a main area (e.g., a store, a toilet, an emergency exit) indoors. The electronic device 300 may map a UWB anchor (e.g., beacon) installed indoors, a retailer or indoor map service, or indoor map information including tag information, so as to receive indoor navigation information from other electronic devices. The electronic device 300 may transmit the received indoor navigation information to another mobile terminal and share the same therewith.

According to various embodiments, the electronic device 300 may receive various types of contents having tag information from an IoT device including a wireless communication circuit, and may share the received contents with various contents stored in the memory 340 of the electronic device 300. For example, the electronic device 300 may share a promotional content such as a coupon, which is received from an IoT device indoors and/or outdoors in a specific space of a retail shop or theme park, with various contents stored in the memory 340.

Figure 13:
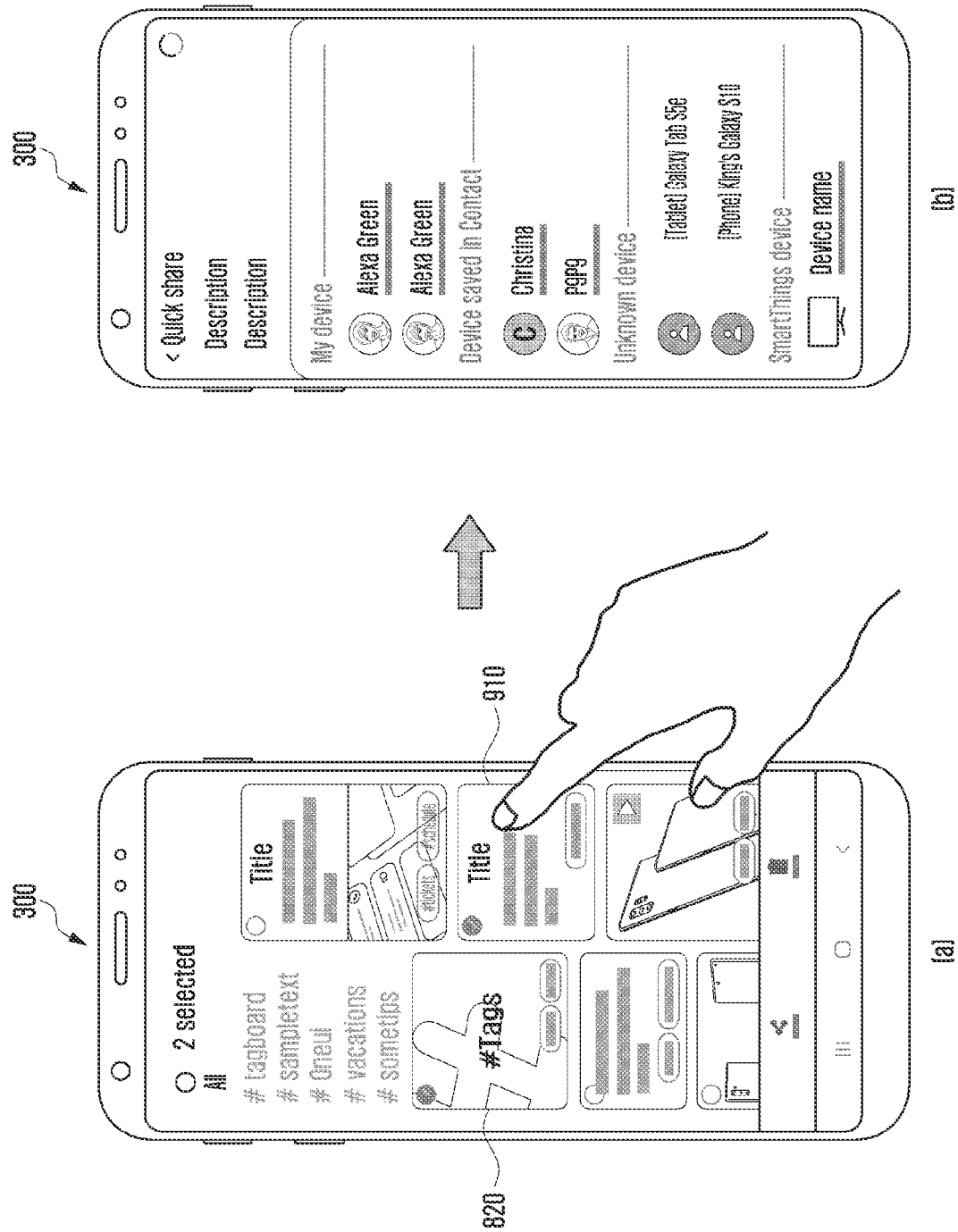
FIG. 13 is a diagram illustrating an example of transmitting various types of contents to a user of another electronic device using an electronic device according to various embodiments.

FIG. 13 is a diagram illustrating an example of transmitting various types of contents to a user of another electronic device using an electronic device according to various embodiments.

Referring to (a) of FIG. 13, the processor 350 of the electronic device 300 according to various embodiments of the disclosure may receive, for example, selection information regarding the text 910 including title information and the image 820, among various types of contents, using the touch display 320.

Referring to (b) of FIG. 13, the processor 350 may receive selection of a user of another electronic device (e.g., the electronic device 102 or 104 of FIG. 1), and then may transmit the received selection information (e.g., the text 910 having title information and the image 820) to another user's application (e.g., Quick Share or SmartThings).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a wireless communication circuit;
   a touch display;
   a processor; and
   memory storing instructions that, when executed by the processor, cause the electronic device to:
      receive tag information on various types of contents and update a database (DB) that is stored in the memory with the tag information;
      acquire tag information having a specific keyword from a user, and control the touch display to display search results for the various types of contents corresponding to the acquired tag information;
      receive from the user selection of at least two types of contents from among the various types of contents including at least two of text and images;
      receive action information for the selected at least two types of contents, the action information being selected by the user from sharing, deletion, and compression;
      perform an action including the at least one of sharing, deletion, and compression corresponding to the received action information;
      group the at least two types of contents selected from among the various types of contents; and
      transmit the grouped at least two types of contents to another electronic device,
   wherein each of the at least two types of contents includes the same tag information and a different attribute value that has been assigned by each of a plurality of applications corresponding to each of the at least two types of contents, and
   wherein the instructions, when executed by the processor, cause the electronic device to process a uniform resource identifier (URI) corresponding to each of the different attribute values to perform the actions including the at least one of sharing, deletion, and compression.

2. The electronic device of claim 1, wherein the processor comprises a multi-content manager configured to collect information on the various types of contents, update the DB, and perform the action.

3. The electronic device of claim 1, wherein based on tag information for the various types of contents not being stored in the memory, the instructions, when executed by the processor, cause the electronic device to recommend tag information.

4. The electronic device of claim 1, wherein the instructions, when executed by the processor, cause the electronic device to arrange search results for the various types of contents in a temporal sequence of generation of the results and control the touch display to display the arranged search results.

5. The electronic device of claim 1, wherein the instructions, when executed by the processor, cause the electronic device to, during providing the search results for the various types of contents, analyze the specific keyword, and provide the search results, other than for characters to be excluded from tag information including the specific keyword.

6. The electronic device of claim 1, wherein the instructions, when executed by the processor, cause the electronic device to display a tag information list corresponding to the specific keyword in real time.

7. A method for operating a content using an electronic device, the method being performed by a processor and comprising:
receiving tag information on various types of contents and updating a database (DB) that is stored in a memory with the tag information;
acquiring tag information having a specific keyword from a user, and displaying, on a touch display, search results for the various types of contents corresponding to the acquired tag information;
receiving from the user selection of at least two types of contents from among the various types of contents including at least two of text and images;
receiving action information for the selected at least two types of contents, the action information being selected by the user from sharing, deletion, and compression;
performing an action including the at least one of sharing, deletion, and compression corresponding to the received action information;
grouping the at least two types of contents selected from among the various types of contents; and
transmitting the grouped at least two types of contents to another electronic device,
wherein each of the at least two types of contents includes the same tag information and a different attribute value that has been assigned by each of a plurality of applications corresponding to each of the at least two types of contents, and
wherein the method further comprises processing a uniform resource identifier (URI) corresponding to each of the different attribute value to perform the action including the at least one of sharing, deletion, and compression.

8. The method of claim 7, wherein the processor comprises a multi-content manager configured to collect information on the various types of contents, update the DB, and perform the action.

9. The method of claim 7, further comprising recommending tag information based on tag information for the various types of contents not being stored in the memory.

10. The method of claim 7, further comprising arranging search results for the various types of contents in a temporal sequence of generation of the results and displaying the arranged search results on the touch display.

11. The method of claim 7, wherein the displaying of the search results for the various types of contents comprises: analyzing the specific keyword, and providing the search results, other than for characters to be excluded from tag information including the specific keyword.

12. The method of claim 7, further comprising displaying a tag information list corresponding to the specific keyword in real time.

* * * * *